(12) United States Patent
Hata et al.

(10) Patent No.: US 8,638,455 B2
(45) Date of Patent: Jan. 28, 2014

(54) PROGRAM EXECUTING APPARATUS, IMAGE PROCESSING APPARATUS AND NON-TRANSITORY COMPUTER READABLE MEDIUM FOR ACTIVATING AN EQUIPMENT USING STORED VARIABLE

(75) Inventors: Tadashi Hata, Kanagawa (JP); Masayoshi Kikuta, Kanagawa (JP); Tadamasa Sakamaki, Kanagawa (JP); Shunsuke Kasahara, Kanagawa (JP); Binhui Liu, Kanagawa (JP); Terutake Hayashi, Kanagawa (JP); Hiroaki Yamamoto, Kanagawa (JP); Masakazu Kawashita, Kanagawa (JP); Hideki Yamasaki, Kanagawa (JP); Yoshifumi Bando, Kanagawa (JP); Yuji Murata, Kanagawa (JP); Shinho Ikeda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 50 days.

(21) Appl. No.: 13/295,721

(22) Filed: Nov. 14, 2011

(65) Prior Publication Data
US 2012/0327440 A1 Dec. 27, 2012

(30) Foreign Application Priority Data

Jun. 24, 2011 (JP) ................................. 2011-141187

(51) Int. Cl.
*G06F 3/12* (2006.01)
(52) U.S. Cl.
USPC .......... 358/1.13; 358/1.15; 358/1.1; 717/136; 711/165
(58) Field of Classification Search
USPC .......... 358/1.15, 1.13, 1.1; 711/165; 717/127, 717/136
See application file for complete search history.

(56) References Cited

U.S. PATENT DOCUMENTS

| | | | |
|---|---|---|---|
| 2002/0129191 A1 | 9/2002 | DaCosta | |
| 2004/0260919 A1* | 12/2004 | Takahashi | ........................ 713/2 |
| 2007/0223033 A1* | 9/2007 | Onno et al. | .................. 358/1.15 |
| 2010/0131932 A1* | 5/2010 | Kato et al. | ..................... 717/136 |
| 2010/0232700 A1 | 9/2010 | Kashibuchi et al. | |

FOREIGN PATENT DOCUMENTS

| | | |
|---|---|---|
| EP | 1 041 486 A2 | 10/2000 |
| EP | 1 852 780 A1 | 11/2007 |
| JP | A-2005-10897 | 1/2005 |
| WO | WO 2004/042557 A2 | 5/2004 |
| WO | WO 2004/107168 A1 | 12/2004 |

OTHER PUBLICATIONS

Oct. 31, 2012 European Search Report issued in Application No. 11193327.1.
Oct. 4, 2013 Written Opinion issued in Patent Application No. 201201759-6.

* cited by examiner

*Primary Examiner* — Qian Yang
*Assistant Examiner* — Martin Mushambo
(74) *Attorney, Agent, or Firm* — Oliff & Berridge, PLC (57) ABSTRACT

A program executing apparatus, includes: a nonvolatile memory that stores a program for activating an equipment and a variable used in the program and sustains the stored program and the variable even though power is not supplied, the program and the variable being able to be read out and written into the nonvolatile memory; and an executing unit that transmits the program and the variable to the nonvolatile memory when the activation of the equipment is instructed at an initial status where the program and the variable are not stored in the nonvolatile memory, and successively executes the program using the variable stored in the nonvolatile memory, and, when the activation of the equipment is re-instructed, executes the program using the variable stored in the nonvolatile memory.

9 Claims, 11 Drawing Sheets

PROGRAM EXECUTING APPARATUS, IMAGE PROCESSING APPARATUS AND NON-TRANSITORY COMPUTER READABLE MEDIUM FOR ACTIVATING AN EQUIPMENT USING STORED VARIABLE

CROSS-REFERENCE TO RELATED APPLICATIONS

This application is based on and claims priority under 35 USC 119 from Japanese Patent Application No. 2011-141187 filed on Jun. 24, 2011.

BACKGROUND

1. Technical Field

The present invention relates to a program executing apparatus, an image processing apparatus and a non-transitory computer readable medium.

2. Related Art

It is proposed a computation system that activates a system using a main memory image that is previously stored in a nonvolatile memory configuring a part of a main memory device.

SUMMARY

According to an aspect of the invention, a program executing apparatus, includes: a nonvolatile memory that stores a program for activating an equipment and a variable used in the program and sustains the stored program and the variable even though power is not supplied, the program and the variable being able to be read out and written into the nonvolatile memory; and an executing unit that transmits the program and the variable to the nonvolatile memory when the activation of the equipment is instructed at an initial status where the program and the variable are not stored in the nonvolatile memory, and successively executes the program using the variable stored in the nonvolatile memory, and, when the activation of the equipment is re-instructed, executes the program using the variable stored in the nonvolatile memory.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described with reference to the accompanying drawings.

Figure 1:
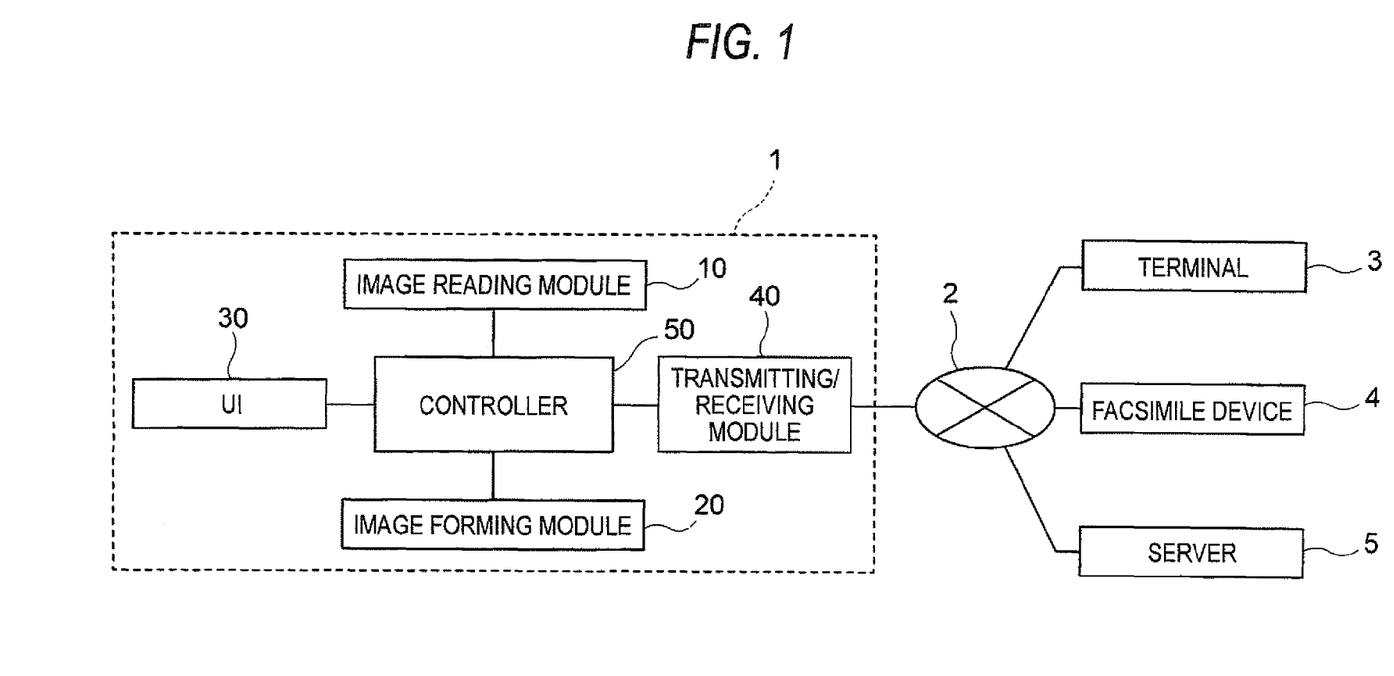
FIG. 1 is a view illustrating an exemplary configuration of an image forming system to which the present embodiment is applied.

FIG. 1 is a view illustrating an exemplary configuration of an image forming system to which the present embodiment is applied.

The image forming system includes an image forming apparatus 1 that has various functions such as a scanning function, a printing function, a copying function, and a facsimile function. The image forming apparatus 1 further has a network 2 connected to the image forming apparatus 1, a terminal 3 connected to the network 2, a facsimile device 4 connected to the network 2, and a server 5 connected to the network 2.

Here, the network 2 is configured by an Internet line, a phone line or the like. The terminal 3 instructs the image forming apparatus 1 to form an image through the network 2, and for example, is configured by a PC (personal computer). The facsimile device 4 transmits/receives facsimile data to/from the image forming apparatus 1 through the network 2. The server 5 transmits/receives data (including programs) to/from the image forming apparatus 1 through the network 2.

The image forming apparatus 1 includes an image reading module 10 configured to read out images recorded in a recording media such as paper, an image forming module 20 configured to form an image on a recording media such as paper, a user interface (UI) 30 configured to receive instructions regarding power ON/OFF and operations using various functions such as a scanning function, a printing function, a copying function, and a facsimile function from a user and configured to display a message for the user. The image forming apparatus 1 furtherer includes a transmitting/receiving module 40 configured to transmit and receive data to/from the terminal 3, the facsimile device 4, and the server 5 through the network 2, and a controller 50 configured to control the operations of the image reading module 10, the image forming module 20, the UI 30, and the transmitting/receiving module 40. According to the image forming apparatus 1, the scanning function as an example of a specific function is implemented by the image reading module 10 as an example of an image processing unit. Further, the printing function as an example of the specific function is implemented by the image forming module 20 as an example of the image processing unit. Also, the copying function as an example of the specific function is implemented by the image reading module 10 and the image forming module 20 as examples of the image processing unit. Moreover, the facsimile function as an example of the specific function is implemented by the image reading module 10, the image forming module 20, and the transmitting/receiving module 40 as examples of the image processing unit. The transmitting/receiving module 40 may be provided, for example, separately for an Internet line and a phone line.

Figure 2:
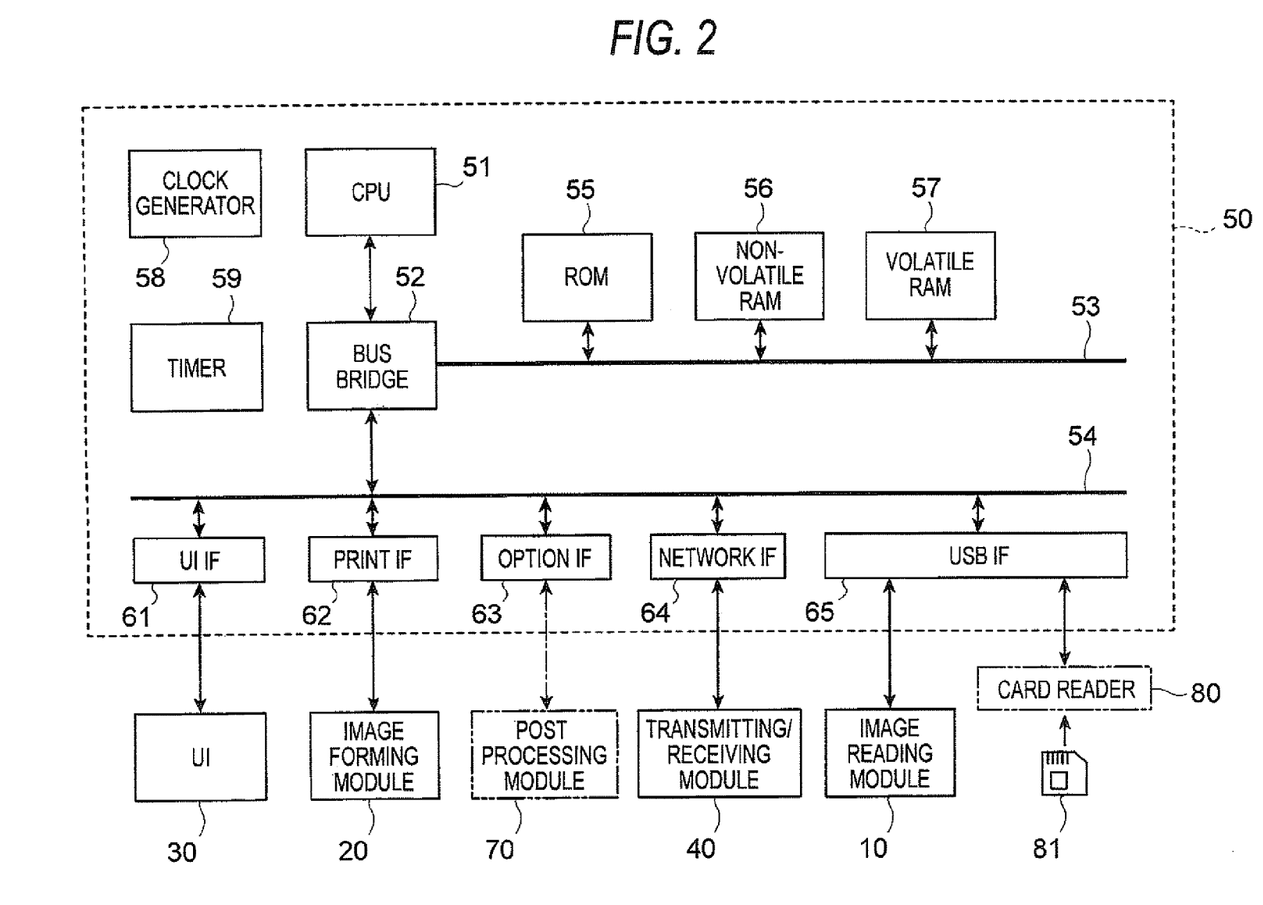
FIG. 2 is a hardware block diagram illustrating an exemplary internal configuration of a controller installed in an image forming apparatus.

FIG. 2 is a hardware block diagram illustrating an exemplary internal configuration of the controller 50 installed in the image forming apparatus 1 shown in FIG. 1.

The controller 50 as an example of a program executing apparatus includes a CPU 51 as an example of an executing unit configured to control the individual modules of the image forming apparatus 1 by performing various operations, and a bus bridge 52 connected to the CPU 51 to exchange various data with the CPU 51. The bus bridge 52 of the controller 50 is connected with a memory bus 53 that exchanges data at a first clock, and a peripheral component interconnect (PCI) bus 54 that exchanges data at a second clock whose frequency is lower than that of the first clock.

The controller 50 includes a ROM 55, a nonvolatile RAM 56, and a volatile RAM 57. The ROM 55, the nonvolatile RAM 56, and the volatile RAM 57 are connected to the memory bus 53, respectively.

The controller 50 further includes a UI IF (interface circuit) 61 configured to control the UI 30, a print IF (interface circuit) 62 configured to control the image forming module 20, an option IF (interface circuit) 63 configured to control option units that is installed in the image forming apparatus 1 as a supplement such as a post processing module 70 that performs a post processing for a recording material on which the image has been formed, a network IF (interface circuit) 64 configured to control the transmitting/receiving module 40, and an universal serial bus (USB) IF (interface circuit) 65 configured to control an USB device. The UI IF 61, the print IF 62, the option IF 63, the network IF 64, and the USB IF 65 are connected to the PCI bus 54, respectively. According to the embodiment, the image reading module 10 is connected to the USB IF 65. For example, a card reader 80 that reads/writes data from/onto an installed memory card 81 may be connected to the USB IF 65.

The controller 50 further includes a clock generator 58 configured to generate a reference clock that corresponds to a reference of a clock by which the individual units (CPU 51, etc.) configuring the controller 50 operate, and a timer 59 configured to count a time according to the operation of the CPU 51.

According to the embodiment, the controller 50 is configured by a single chip micro controller. However, the controller 50 may be configured by a plurality of chips.

In the controller 50 of the embodiment, the CPU 51 can directly access the ROM 55, the nonvolatile RAM 56, and the volatile RAM 57. Therefore, hereinafter, the ROM 55, the nonvolatile RAM 56 and the volatile RAM 57 each connected to the memory bus 53 may be collectively referred to as a "main memory".

Here, the ROM 55 as an exemplary storage unit is configured by so-called a mask ROM, various programmable ROM (PROMs), for example, an one time programmable ROM (OTP ROM), a Ultra-Violet Erasable Programmable ROM (UV-EPROM), an electrically erasable programmable ROM (EEPROM)), and a flash memory. In the embodiment, a flash memory is used as the ROM 55.

The nonvolatile RAM 56 as an exemplary storage unit, such as a magnetoresistive RAM (MRAM), a ferroelectric RAM (FeRAM), a phase change RAM (PRAM), and a resistance RAM (ReRAM), is configured by a nonvolatile memory that can sustain stored data even though power is not supplied. In the embodiment, an MRAM that can read/write data at a higher speed than that of the flash memory used as the ROM 55 is used as the nonvolatile RAM 56.

The volatile RAM 57 is configured by a volatile memory, such as a dynamic RAM (DRAM) or a static RAM (SRAM), that cannot sustain the stored data if the power is not supplied. In the embodiment, the DRAM is used as the volatile RAM 57.

According to the embodiment, both the nonvolatile RAM 56 and the volatile RAM 57 perform reading and writing operations at the first clock. Therefore, the nonvolatile RAM 56 has the reading and writing capability that is equal to that of the volatile RAM 57 (DRAM in the embodiment).

Figure 3:
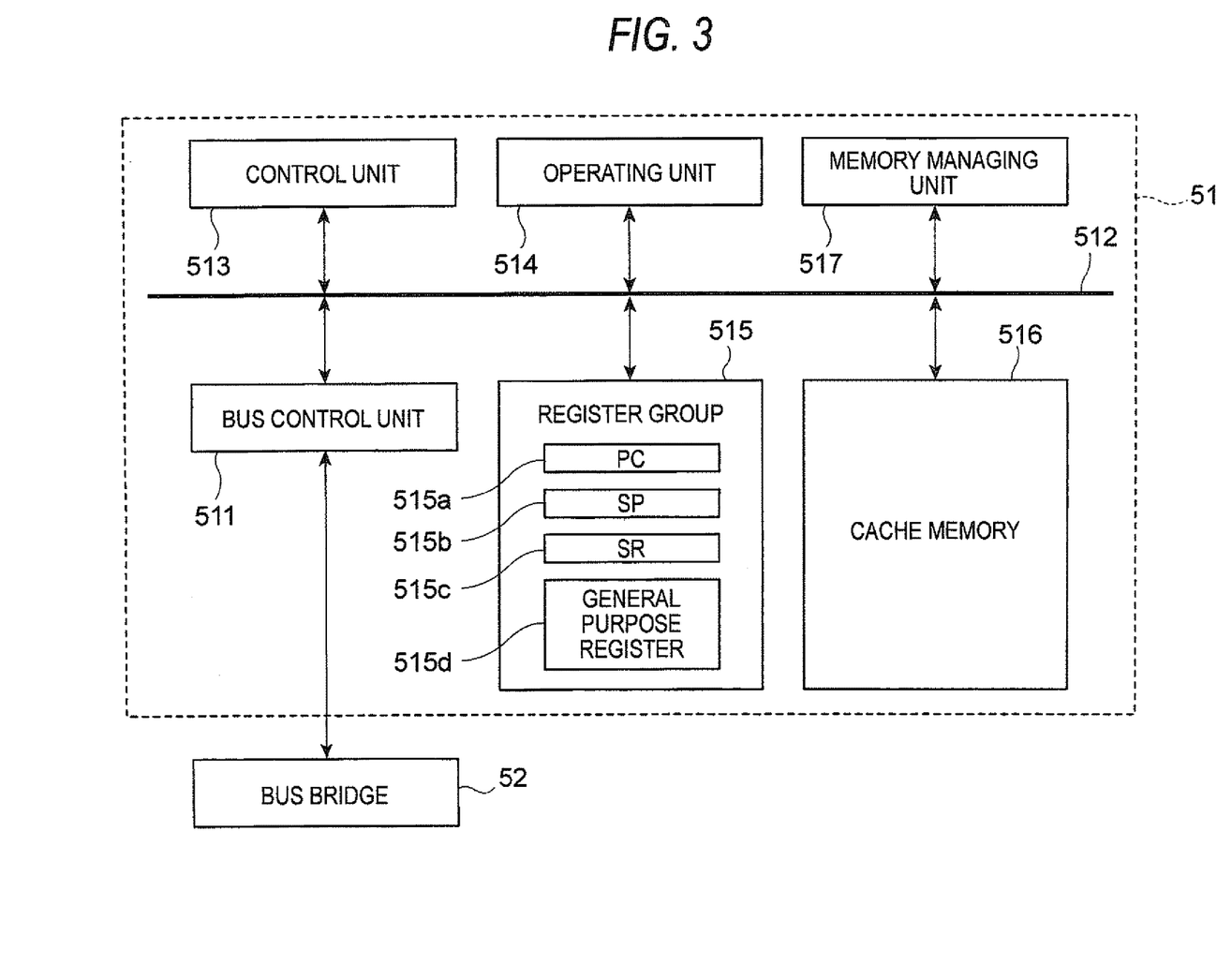
FIG. 3 is a hardware block diagram illustrating an exemplary internal configuration of a CPU installed in the controller.

FIG. 3 is a hardware block diagram illustrating an exemplary internal configuration of the CPU 51 installed in the controller 50 as shown in FIG. 2.

The CPU 51 according to the embodiment includes a bus control unit 511 that is connected to the bus bridge 52 installed in the controller 50 and exchanges various data with the bus bridge 52, and includes a CPU internal bus 512 that is connected to the bus control unit 511 and exchanges various data at a third clock having a higher frequency than the above-mentioned first clock in the CPU 51. The CPU 51 further includes a control unit 513 configured to control individual units in the CPU 51, and a calculation unit 514 configured to perform various calculations according to the program that is read out. The CPU 51 also includes a register group 515 that includes various registers for sustaining an address in which a program executed by the operating unit 514 is stored, the operation result of the operating unit 514, and an address at the time of exchanging data with the main memory (the ROM 55, the nonvolatile RAM 56, and the volatile RAM 57). The CPU 51 further includes a cache memory 516 configured to temporally sustain the operation result of the operating unit 514, and a memory management unit 517 configured to process the memory access requested by the CPU 51.

Here, the register group 515 includes a program counter (PC) 515a configured to sustain an address on the main memory that stores a command to be executed next by the operating unit 514, a stack pointer (SP) 515b configured to sustain an address of a stack area that is provided to temporally store the data, a status register (SR) 515c configured to sustain the CPU 51 status or an operation status, and a general purpose register 515d that serves as an accumulator used to temporarily store data during an operation or data transmission, an address register configured to sustain an address to access data on the main memory, and a control register configured to sustain information for setting operations of the CPU 51.

Both the register group 515 and the cache memory 516 are configured by a volatile memory that cannot sustain the stored data if power is not supplied thereto. According to the embodiment, as the register group 515 and the cache memory 516, an SRAM that can read/write data at a higher speed than the DRAM that is used for the volatile RAM 57 is used.

Figure 4:
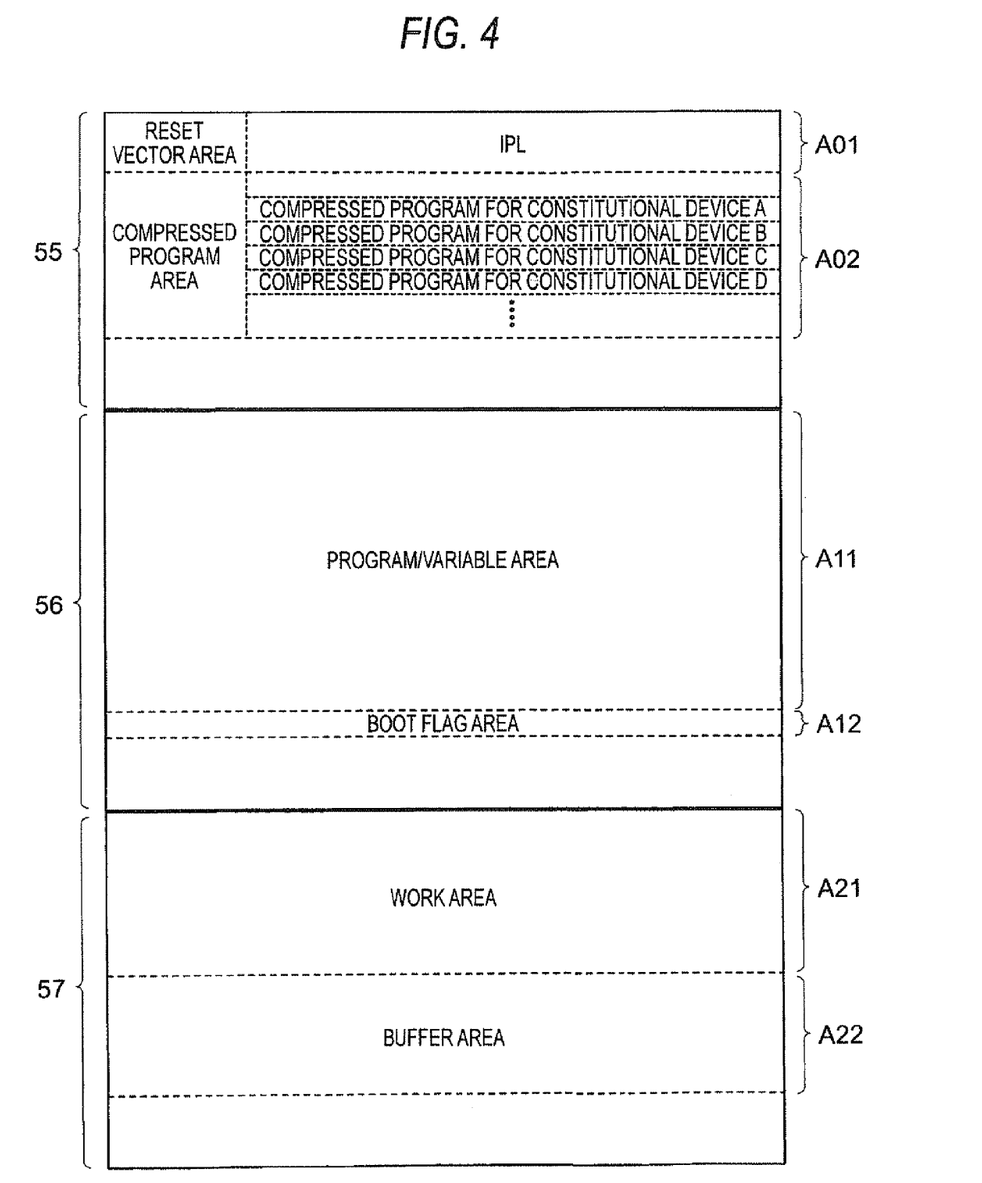
FIG. 4 is a view illustrating an exemplary configuration of a memory map laid out in a main memory.

FIG. 4 is a view illustrating an example of a configuration of a memory map laid out in the above-mentioned main memory (the ROM 55, the nonvolatile RAM 56, and the volatile RAM 57).

According to the embodiment, a reset vector area A01 and a compressed program area A02 are disposed in the ROM 55, a program/variable area A11 and a boot flag area A12 are disposed in the nonvolatile RAM 56, and a work area A21 and a buffer area A22 are disposed in the volatile RAM 57.

Among the areas, the reset vector area A01 disposed in the ROM 55 stores an initial program loader (IPL) that is a program executed by the CPU 51 in the controller 50 when the image forming apparatus 1 is activated. Programs corresponding to individual constitutional devices that can be installed in the image forming apparatus 1 according to the embodiment and variables used in the programs (hereinafter, referred to as "program(s)/variable(s)) are stored by being combined and compressed for each constitutional device in the compressed program area A02 that is placed in the ROM 55. For example, according to the embodiment shown in FIG. 4, a compressed program in which a program/variable for operating constitutional device A is compressed (a compressed program for constitutional device A), a compressed program in which a program/variable for operating constitutional device B is compressed (a compressed program for constitutional device B), a compressed program in which a program/variable for operating constitutional device C is compressed (a compressed program for constitutional device C), and a compressed program in which a program/variable for operating constitutional device D is compressed (a compressed program for constitutional device D), and the like are stored in the compressed program area A02. The above-mentioned constitutional device A to D correspond to the image reading module 10, the image forming module 20, the UI 30, the transmitting/receiving module 40, the post processing module 70, and the card reader 80 described above, respectively. Constitutional devices A to D can be attached/detached to/from the main body of the image forming apparatus 1. If constitutional devices A to D are installed in the image forming apparatus 1, constitutional devices A to D may perform predetermined functions solely or together with the other constitutional devices.

As described above, according to the embodiment, regardless of the configuration of the image forming apparatus 1 which is actually used (for example, the image forming apparatus 1 shown in FIG. 1 does not include the post processing module 70), a plurality of compressed programs corresponding to the respective constitutional devices which can be installed in the image forming apparatus 1 are stored in the compressed program area A02 disposed in the ROM 55 in advance. Accordingly, even when the configuration of the image forming apparatus 1 is changed, there is no need to exchange the ROM 55 nor update the program stored in the ROM 55.

Next, a program/variable that is obtained by decompressing a compressed program that is read out from the compressed program area A02 described above by the CPU 51 is stored in the program/variable area A11 disposed in the nonvolatile RAM 56. A flag indicating whether the image forming apparatus 1 has ever been activated in the past is stored in the boot flag area A12 disposed in the nonvolatile RAM 56. In this case, if the image forming apparatus 1 has ever been activated in the past, "ON (1)" is stored in the boot flag area A12. In contrast, if the image forming apparatus 1 has not been activated in the past, "OFF (0)" is stored in the boot flag area A12. In the embodiment, it is described that the boot flag area A12 is disposed in the nonvolatile RAM 56. But the boot flag area A12 may be disposed in the ROM 55. If an error occurs or there is a user's instruction by the UI 30 or a special booting, the boot flag area A12 may be cleared.

Data that is temporally generated according to the execution of a program by the CPU 51 is stored in the work area A21 disposed in the volatile RAM 57. Data regarding the instructions (data output to the IFs through the PC1 bus 54) that are output to the individual configurations of the image forming apparatus 1 according to the data processing by the CPU 51 is stored in the buffer area A22 disposed in the volatile RAM 57.

Figure 5:
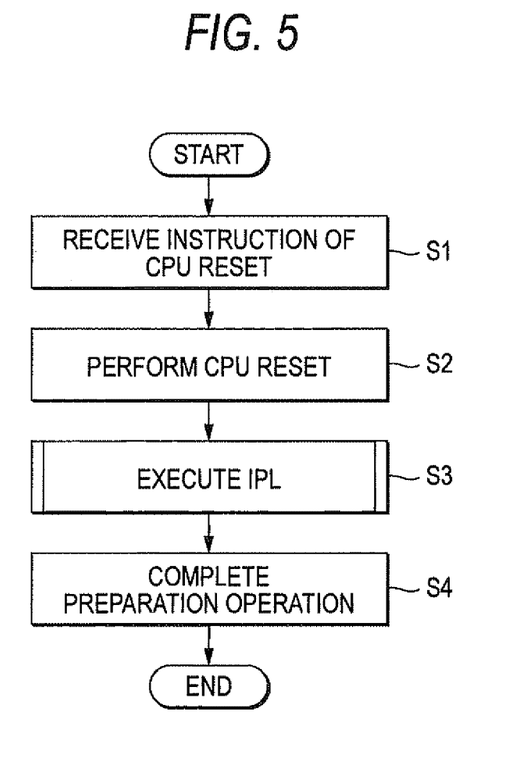
FIG. 5 is a flow chart illustrating an activation process of the image forming apparatus.

FIG. 5 is a flow chart illustrating an activation process of the image forming apparatus 1 shown in FIG. 1. The activation process is performed when a reset instruction is input to the CPU 51 as power is supplied to the image forming apparatus 1 through the UI 30 or when a reset instruction is input to the CPU 51 due to some reasons after power is supplied to the image forming apparatus 1.

If the CPU 51 installed in the controller 50 receives the reset instruction (step 1), the CPU 51 performs its resetting (CPU reset) (step 2). In response to the CPU reset, the contents stored in the register group 515 and the cache memory 516 (that are configured by nonvolatile memories) installed in the CPU 51 are cleared. Further, in response to the CPU reset, the contents stored in the volatile RAM 57 installed in the controller 50 are also cleared. However, even though the CPU reset is accomplished, the stored contents stored in the ROM 55 and the nonvolatile memory 56 installed in the controller 50 are not cleared, but maintain the contents stored before the CPU is reset.

Continuously, the CPU 51 reads out the initial program loader (IPL) stored in the reset vector area A01 of the ROM 55 through the bus bridge 52 and the memory bus 53, and executes the read IPL (step 3) in order to be ready for using the individual configuration installed in the image forming apparatus 1. As the preparation operation of the image forming apparatus 1 is completed (step 4), a series of activation process is completed.

Continuously, the execution of the IPL in the above-described step 3 will be described in more detail.

As the IPL is being executed, the CPU 51 reads the compressed program from the ROM 55, and stores the program/variable obtained by decompressing the compressed program in the nonvolatile RAM 56 and executes the program/variable to activate the image forming apparatus 1.

However, if the CPU 51 reads the compressed program from the ROM 55, and stores the program/variable obtained by decompressing the compressed program in the nonvolatile RAM 56 in a second or later activation, the activation time of the image forming apparatus 1 becomes longer.

Therefore, according to the embodiment, only in the first activation, the compressed program is read from the ROM 55 and decompressed, and at the second or later activation, at least a part of processing that reads the compressed program from the ROM 55 and decompresses the program is omitted, such that the activation time of the image forming apparatus 1 is reduced. In this specification, the term "first activation" refers to not only the first activation after shipment of the image forming apparatus 1, but also an activation of the image forming apparatus 1 at an initial status where a program/variable is not stored in the nonvolatile RAM 56. The term "second or later activation" refers to the activation until the image forming apparatus 1 becomes the initial status again after the first activation.

Specifically, there are three examples of the activating method that can reduce the activation time of the image forming apparatus 1, and the methods will be described in detail as a first embodiment, a second embodiment, and a third embodiment in this order.

First Embodiment

Figure 6:
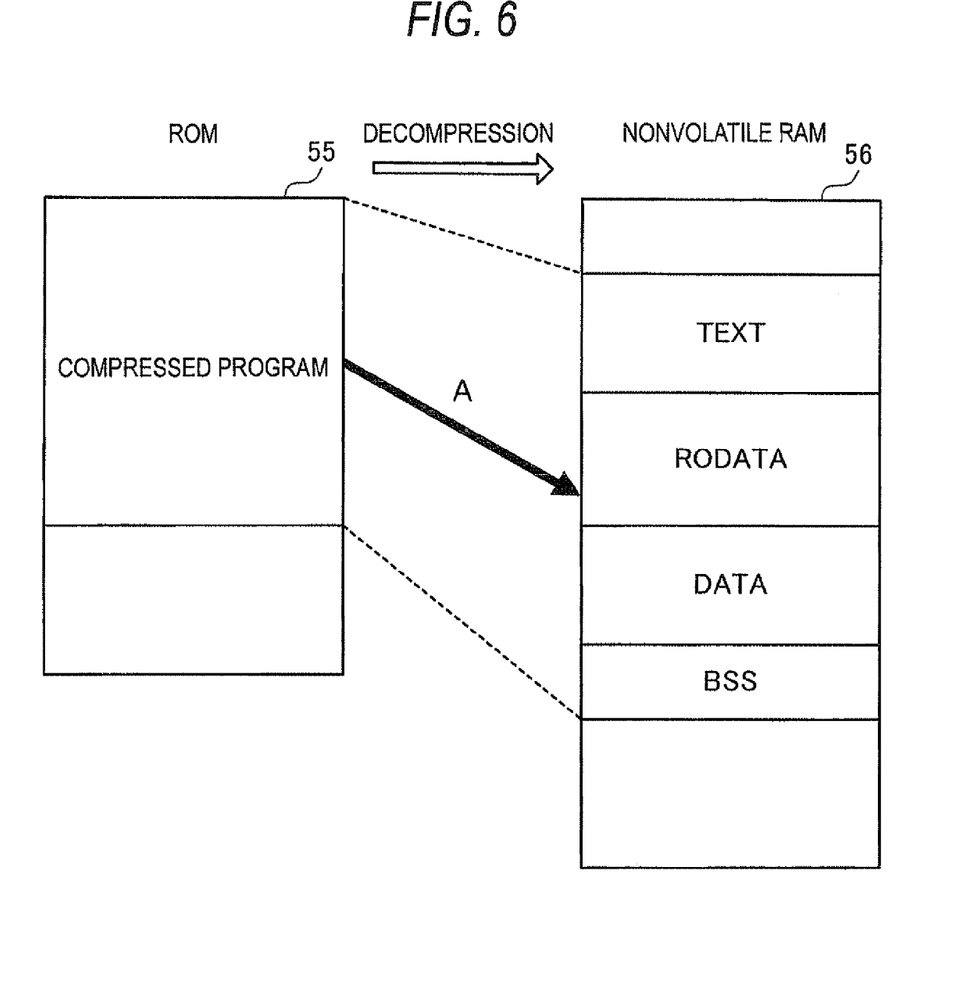
FIG. 6 is a schematic view illustrating an activation method of the image forming apparatus according to a first embodiment.

FIG. 6 is a schematic view illustrating an activation method of an image forming apparatus 1 according to a first embodiment.

Since no program/variable is stored in the nonvolatile RAM 56 at the first activation, as indicated by arrow A, it is needed to read and decompress the compressed program from the ROM 55 and store the program in the nonvolatile RAM 56.

However, at the second or later activation, since a program/variable has been stored in the nonvolatile RAM 56, there is no need to read and decompress the compressed program from the ROM 55 again. Therefore, at the second or later activation, the processing of reading and decompressing the compressed program from the ROM 55 is omitted, which enables the activation of the image forming apparatus 1 to speed up.

According to the first embodiment, as the program/variable that is stored in the nonvolatile RAM 56 by decompressing the compressed program, as shown in FIG. 6, TEXT, read-only data (RODATA), DATA, and block started by symbol (BSS) may be considered. Among these, the TEXT is a code of a program obtained by decompressing the compressed program. The RODATA is a variable (integer) which does not vary among variables obtained by decompressing the compressed program. The DATA is a variable which varies and has an initial value, among variables obtained by decompressing the compressed program. The BSS is a variable that varies and does not have an initial value, among variables obtained by decompressing the compressed program.

Continuously, the execution of the IPL according to the first embodiment will be described in more detail.

Figure 7:
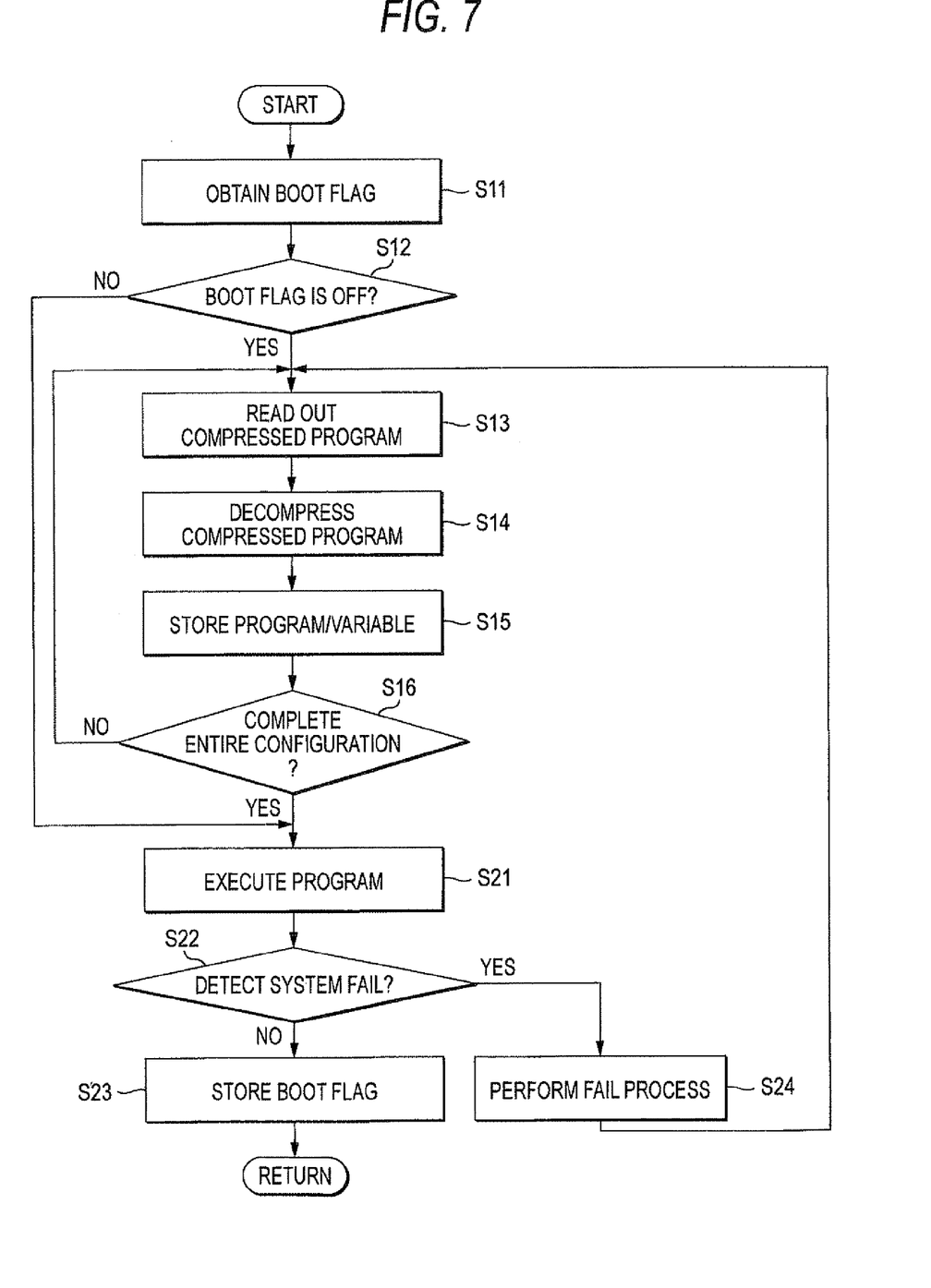
FIG. 7 is a flow chart illustrating a process order according to the execution of an IPL according to the first embodiment.

FIG. 7 is a flow chart illustrating a processing order according to the execution of the IPL according to the first embodiment. According to the execution of the IPL, the CPU 51 reads out and obtains the boot flag from the boot flag area A12 of the nonvolatile RAM 56 (step 11). The CPU 51 also determines whether the boot flag is OFF (0), that is, whether this activation is the first activation or not (step 12).

If it is determined to be positive ("Yes") in step 12, that is, this activation is the first activation, the CPU 51 continuously reads out a compressed program corresponding to one constitutional device included in all of the constitutional devices of the apparatus from the compressed program area A02 of the ROM 55 (step 13), and decompresses the compressed program that is read out in step 13 (step 14), and stores the program/variable (TEXT, RODATA, DATA, and BSS) obtained by decompressing the compressed program in step 14 in the program/variable area A11 of the nonvolatile RAM 56 (step 15). Thereafter, it is determined whether it is completed to store the programs/variables corresponding to the entire configuration in the program/variable area A11 (step 16). In step 16, if it is determined to be negative ("No"), the process returns to step 13, and proceeds to read out the compressed program corresponding to the remaining configuration, decompress the read compressed program, and store the program/variable obtained by decompression.

In the meantime, if it is determined to be positive ("Yes") in step 16, the process proceeds to step S21.

If it is determined to be negative ("No") in step 12, that is, this activation is the second or later activation, the process proceeds to step 21 to be described below.

Thereby, the CPU 51 executes the individual programs stored in the program/variable area A11 of the nonvolatile RAM 56 using corresponding variables (step 21), and determines whether a system fail is detected (step 22). Here, the "system fail" is an error in which the individual programs are not normally operated when they are executed in step 21 or may be an error found by performing an error check on the individual programs/variables before executing the individual programs in step 21.

If it is determined to be negative ("No") in step 22, that is, the system fail is not detected, the CPU 51 stores "ON (1)" in the boot flag area A12 of the nonvolatile RAM 56 as a boot flag (step 23).

In the meantime, if it is determined to be positive ("Yes") in step 22, that is, the system fail is detected, the CPU 51 stops processing right there, and performs the fail process (step 24). Herein, as an example of the fail process, for example, notifying a user that the system fail occurs using the UI 30 can be considered. If the system fail has been occurred, the process returns to step 13 since there is a need to decompress the compressed program.

Second Embodiment

Figure 8:
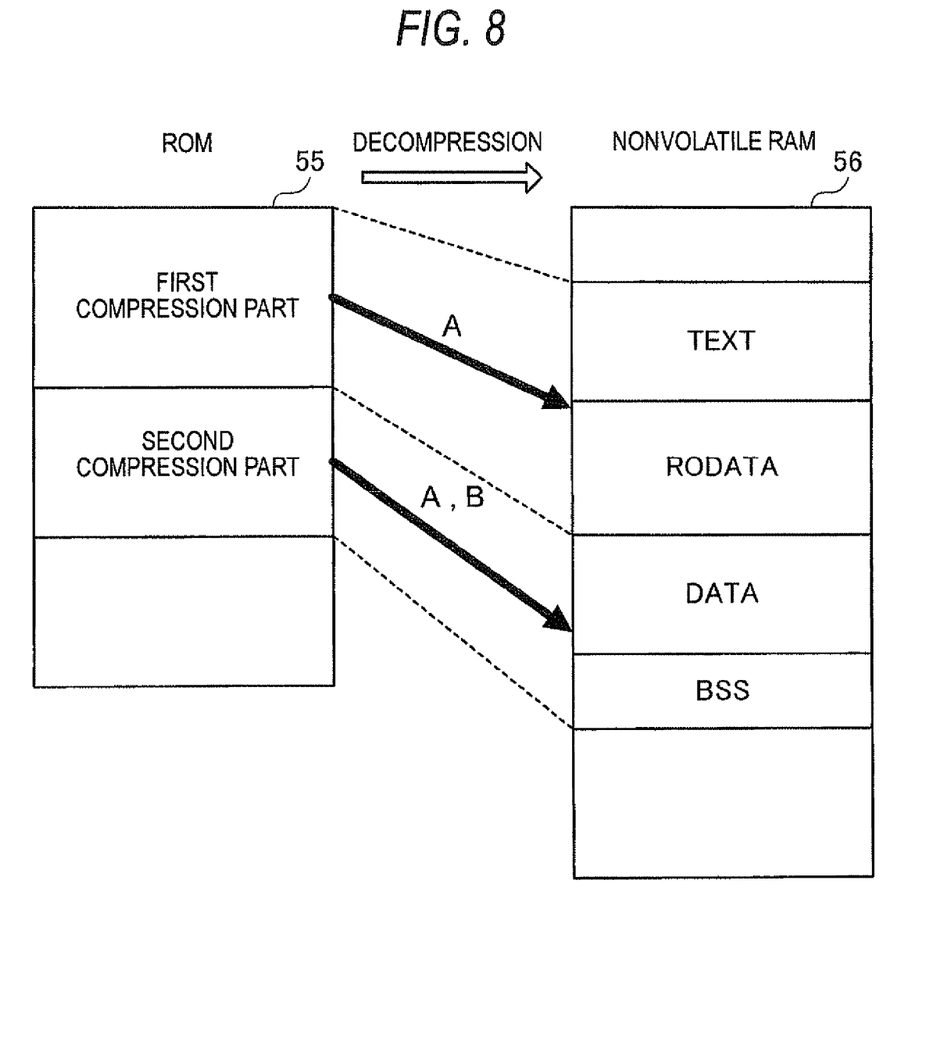
FIG. 8 is a schematic view illustrating an activation method of an image forming apparatus according to the second embodiment.

FIG. 8 is a schematic view illustrating an activation method of an image forming apparatus 1 according to a second embodiment.

In the above-described first embodiment, the data stored in the nonvolatile RAM 56 at the first activation is not initialized at the second or later activation, but some data may needs to be initialized at the second or later activation. Among the programs/variables stored in the nonvolatile RAM 56, the TEXT and the RODATA do not need to be initialized because the values thereof do not vary. However, since the values of the DATA and the BSS vary, the DATA and the BSS may be initialized.

Accordingly, according to the second embodiment, a first compression part in which the TEXT and the RODATA are compressed and a second compression part in which the DATA and the BSS are compressed are stored in the ROM 55 as components of the compressed program. At the first activation, as indicated by arrow A, the first compression part and the second compression part are read out and decompressed from the ROM 55, so that the TEXT, the RODATA, the DATA, and the BSS are stored in the nonvolatile RAM 56. At the second or later activation, as indicated by arrow B, only the second compression part is read out and decompressed from the ROM 55, so that the DATA and the BSS are stored in the nonvolatile RAM 56 again. That is, at the second or later activation, the process of decompressing the first compression part and storing the TEXT and the RODATA is not performed, resulting in shortening the activation time of the image forming apparatus 1.

The user may select in advance whether to use the above activating method.

According to the second embodiment, it is described that the first compression part in which the TEXT and the RODATA are compressed and the second compression part in which the DATA and the BSS are compressed are stored in the ROM 55. However, as in the first embodiment, the compressed program in which the TEXT, the RODATA, the DATA, and the BSS are compressed may be stored in the ROM 55. However, in this case, at the first activation, the TEXT, the RODATA, the DATA, and the BSS that are obtained by decompressing the compressed program are stored in the nonvolatile RAM 56, and at the second or later activation, the DATA and the BSS among the TEXT, the RODATA, the DATA, and the ESS that are obtained by decompressing the compressed program are stored in the nonvolatile RAM 56.

Continuously, the execution of the IPL according to the second embodiment will be described in more detail.

Figure 9:
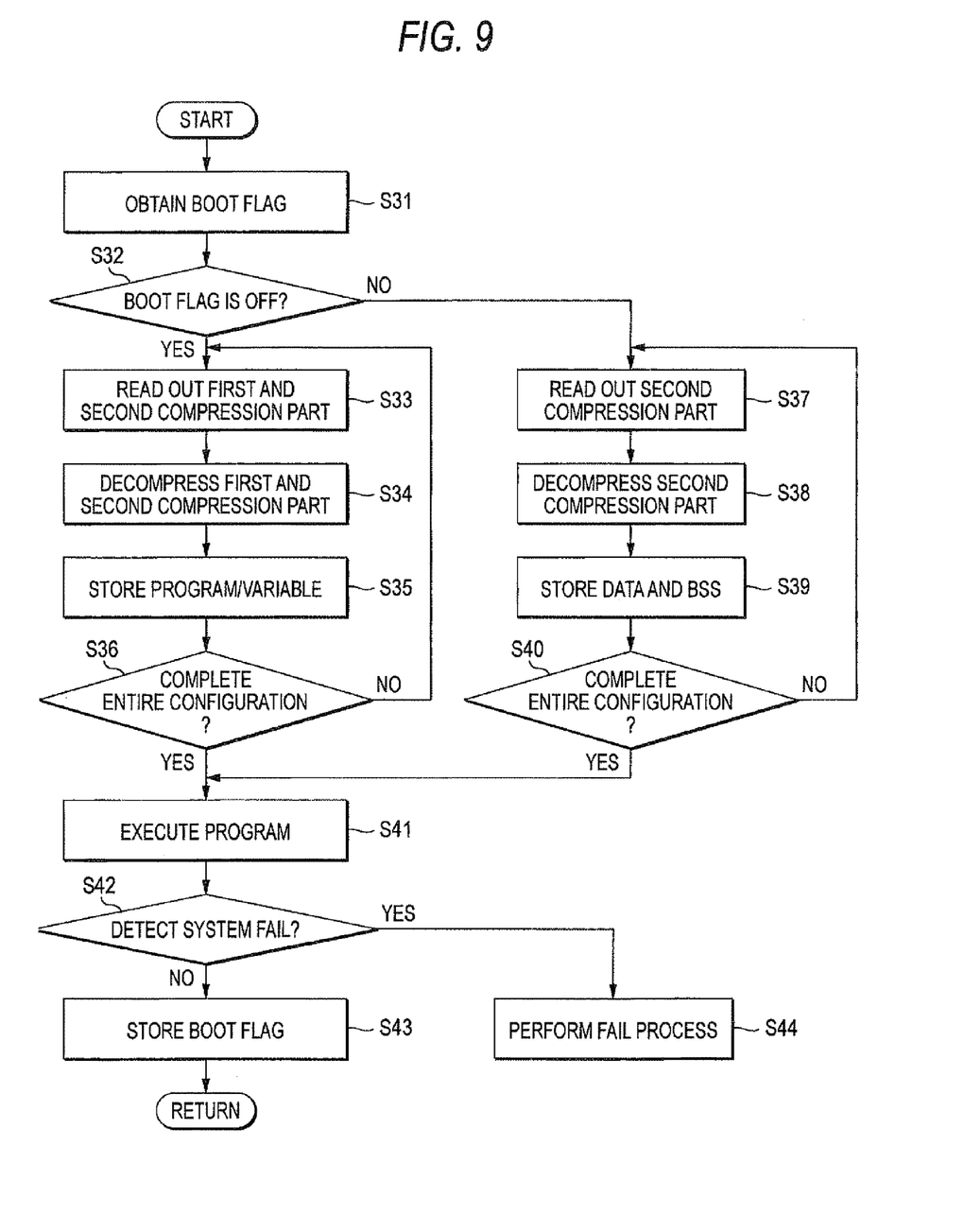
FIG. 9 is a flow chart illustrating a process order according to the execution of an IPL according to the second embodiment.

FIG. 9 is a flow chart illustrating a processing order according to the execution of an IPL according to the second embodiment.

According to the execution of the IPL, the CPU 51 reads out and obtains the boot flag from the boot flag area A12 of the nonvolatile RAM 56 (step 31). The CPU 51 also determines whether the boot flag is OFF (0), that is, whether this activation is the first activation or not (step 32).

If it is determined to be positive ("Yes") in step 32, that is, this activation is the first activation, the CPU 51 continuously reads out a first compression part and a second compression part corresponding to one constitutional device included in all of the constitutional devices of the apparatus from the compressed program area A02 of the ROM 55 (step 33), and decompresses the first compression part and the second compression part read in step 33 (step 34). And the CPU 51 stores the program/variable (TEXT and RODATA) obtained by decompressing the first compression part in step 34 and the variable (DATA and BSS) obtained by decompressing the second compression part in step 34 in the program/variable area A11 of the nonvolatile RAM 56 (step 35). Thereafter, it is determined whether it is completed to store the programs/variables corresponding to all of the constitutional devices in the program/variable area A11 (step 36). In step 36, if it is determined to be negative ("No"), the process returns to step 33 and continuously performs reading out the first compression part and the second compression part corresponding to the remaining constitutional devices, decompressing the read first and second compression parts, and storing the program/variable obtained by decompression.

In the meantime, if it is determined to be positive ("Yes") in step 36, the processing proceeds to step S41.

If it is determined to be negative ("No") in step 32, that is, this activation corresponds to the second or later activation, the CPU 51 reads out the second compression part corresponding to one constitutional device included in all of the constitutional devices of the apparatus configuration from the compressed program area A02 of the ROM 55 (step 37), and decompresses the second compression part read in step 37 (step 38). The variable (DATA and BSS) obtained by decompressing the second compression part in step 38 is stored in the program/variable area A11 of the nonvolatile RAM 56 (step 39). Thereafter, it is determined whether it is completed to store the variables corresponding to all of the constitutional devices in the program/variable area A11 (step 40). In step 40, if it is determined to be negative ("No"), the process returns to step 37 and continuously performs reading out the second compression part corresponding to the remaining constitutional devices, decompressing the read second compression part, and storing the variable obtained by decompression.

In the meantime, if it is determined to be positive ("Yes") in step 40, the processing proceeds to step S41, which will be described below.

Thereby, the CPU 51 executes the individual programs stored in the program/variable area A11 of the nonvolatile RAM 56 using corresponding variables (step 41), and determines whether a system fail is detected (step 42). Here, the "system fail" is an error in which the programs are not normally operated when the individual programs are executed in step 41 or an error found by performing an error check on the individual programs/variables before the individual programs is executed in step 41.

If it is determined to be negative ("No") in step 42, that is, the system fail is not detected, the CPU 51 stores "ON (1)" in the boot flag area A12 of the nonvolatile RAM 56 as a boot flag (step 43).

In the meantime, if it is determined to be positive ("Yes") in step 42, that is, the system fail is detected, the CPU 51 stops processing right there, and performs the fail processing (step 44). Herein, as an example of fail processing, for example, notifying a user that the system fail occurs using the UI 30 can be considered. If the system fail occurred, since there is a need to initialize at least the variables (the DATA and the BSS) again, the process returns to step 33 in case of the first activation, or returns to step 33 or step 37 in case of the second or later activation.

Third Embodiment

Figure 10:
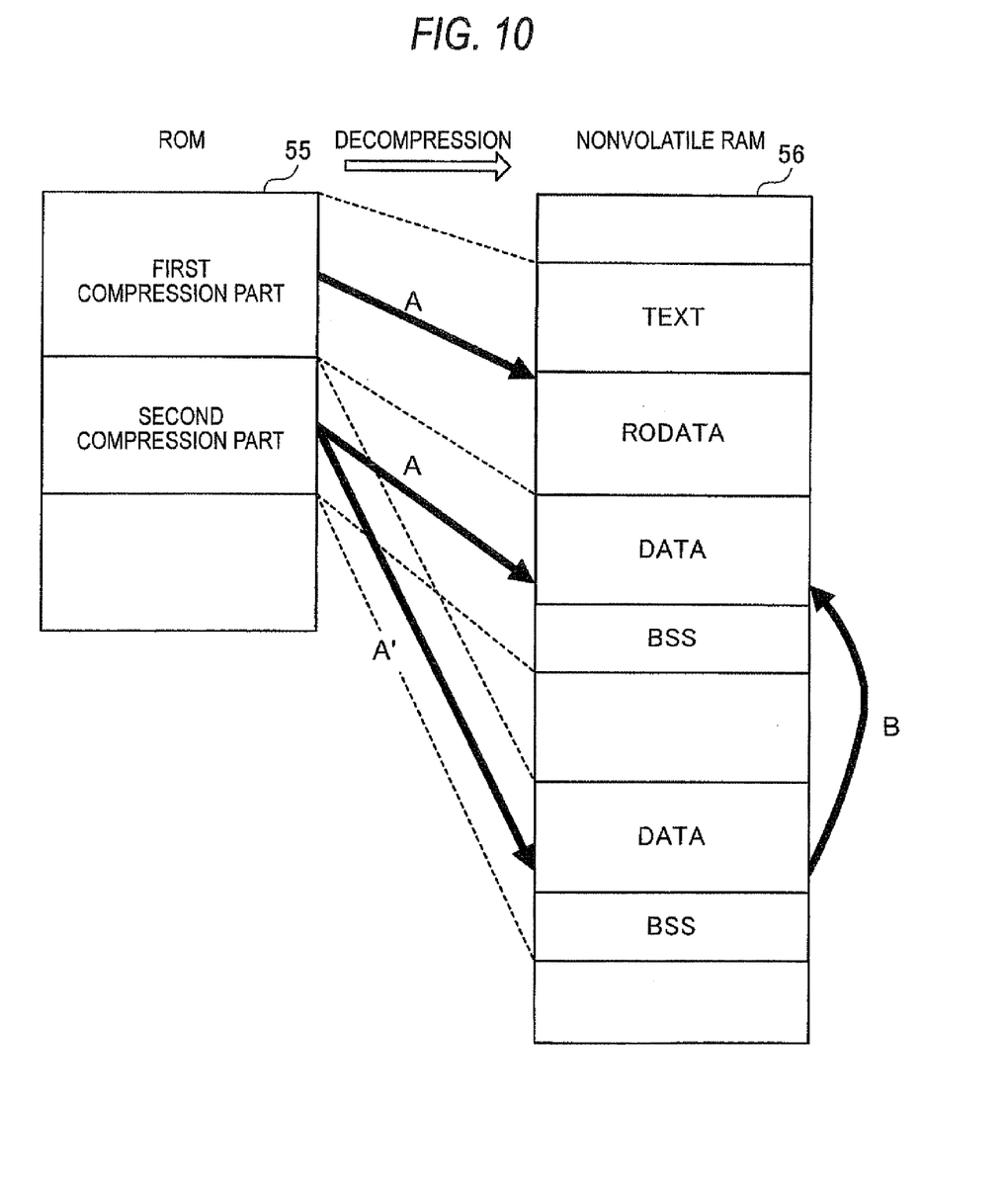
FIG. 10 is a schematic view illustrating an activation method of the image forming apparatus according to the third embodiment.

FIG. 10 is a schematic view illustrating an activation method of an image forming apparatus 1 according to the third embodiment.

In the above second embodiment, the second compression part is read out and decompressed from the ROM 55 at the second or later activation, so that the DATA and the BSS are stored in the nonvolatile RAM 56. However, in the second embodiment, since the second compression part needs to be read out and decompressed from the ROM 55, it takes some more time for activation.

Therefore, according to the third embodiment, at the first activation, as indicated by arrow A, the first compression part and the second compression part are read out and decompressed from the ROM 55 so that the TEXT, the RODATA, the DATA, and the BSS are stored in the nonvolatile RAM 56. Further, as indicated by arrow A', the DATA and the BSS are copied in a separate area of the nonvolatile RAM 56. At the second or later activation, as indicated by arrow B, the DATA and the BSS are read out from the separate area and then stored in an area where they are destined to be originally stored. Therefore, as compared with the method of reading and decompressing the second compression from the ROM 55 to store the DATA and the BSS in the nonvolatile RAM 56, it is possible to store the DATA and the BSS in the nonvolatile RAM 56 at a higher speed, which results in further shortening the activation time of the image forming apparatus 1.

The user may select in advance whether to use the above activating method.

According to the third embodiment, it is described that the first compression part in which the TEXT and the RODATA are compressed and the second compression part in which the DATA and the BSS are compressed are stored in the ROM 55. However, as in the first embodiment, the compressed program in which the TEXT, the RODATA, the DATA, and the BSS are compressed may be stored in the ROM 55.

Continuously, the execution of the IPL according to the third embodiment will be described in more detail.

Figure 11:
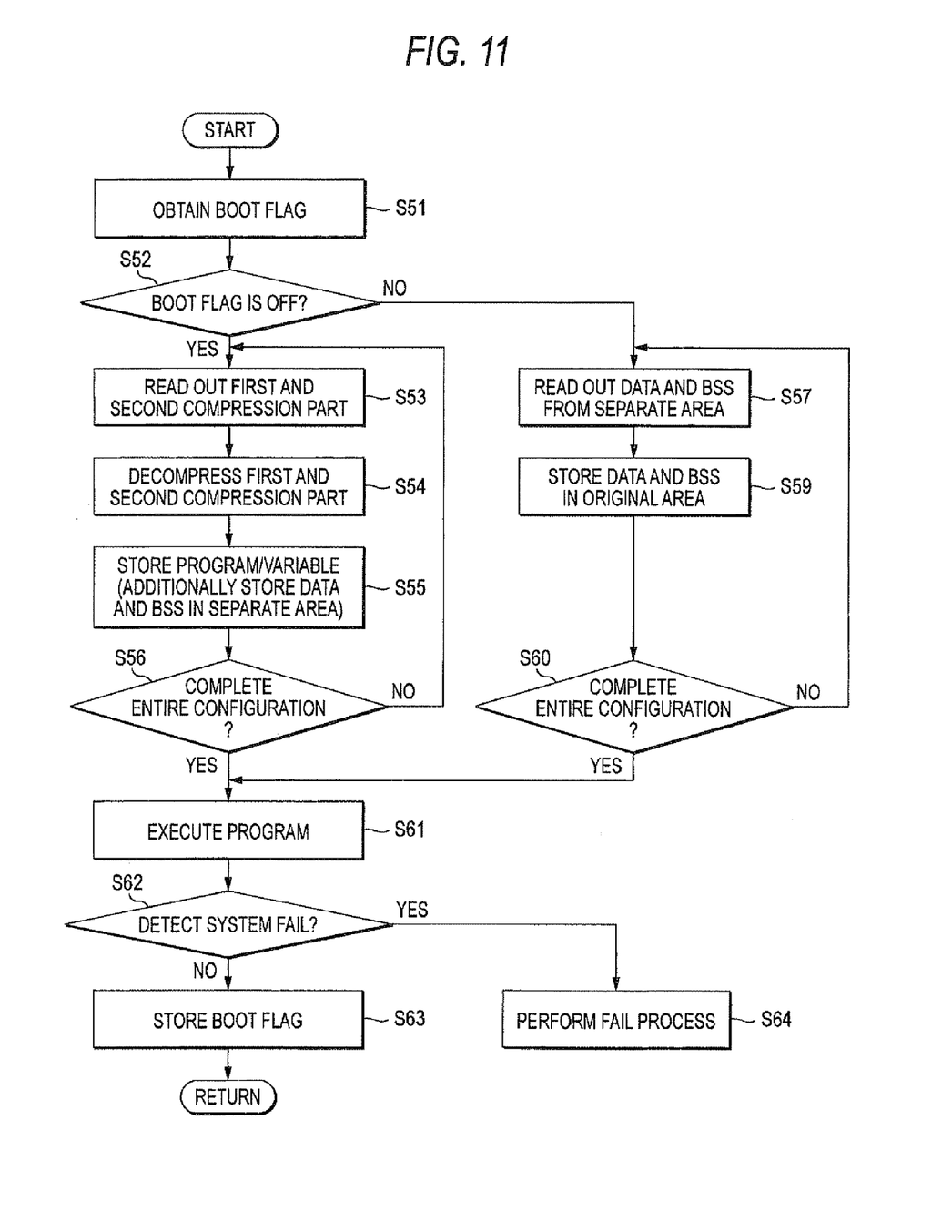
FIG. 11 is a flow chart illustrating a process order according to the execution of an IPL according to the third embodiment.

FIG. 11 is a flow chart illustrating a processing order according to the execution of an IPL according to the third embodiment.

According to the execution of the IPL, the CPU 51 reads out and obtains the boot flag from the boot flag area A12 of the nonvolatile RAM 56 (step 51). The CPU 51 also determines whether the boot flag is OFF (0), that is, whether this activation is the first activation or not (step 52).

If it is determined to be positive ("Yes") in step 52, that is, this activation is the first activation, the CPU 51 continuously reads out a first compression part and a second compression part corresponding to one constitutional device included in all of the constitutional devices of the apparatus from the compressed program area A02 of the ROM 55 (step 53), and decompresses the first compression part and the second compression part that have been read out in step 53 (step 54). Subsequently, the program/variable (TEXT and RODATA) obtained by decompressing the first compression part in step 54 and the variables (DATA and BSS) obtained by decompressing the second compression part in step 54 are stored in an area where the variables are directed to be originally stored in the program/variable area A11 of the nonvolatile RAM 56. And then, the variables (DATA and BSS) obtained by decompressing the second compression part in step 54 are stored in an area separate from the area where the variables are directed to be originally stored in the program/variable area A11 of the nonvolatile RAM 56 (step 55). Thereafter, it is determined whether it is completed to store the programs/variables corresponding to all of the constitutional devices in the program/variable area A11 (step 56). In step 56, if it is determined to be negative ("No"), the process returns to step 53, and continuously performs reading out the first compression part and the second compression part corresponding to the remaining constitutional devices, decompressing the read first and second compression parts, and storing the program/variable obtained by decompression.

In the meantime, if it is determined to be positive ("Yes") in step 56, the process proceeds to step S61 to be described below.

If it is determined to be negative ("No") in step 52, that is, this activation is the second or later activation, the CPU 51 reads out the variables (DATA and BSS) corresponding to one constitutional device included in all of the constitutional devices of apparatus from an area separate from the area where the variables are destined to be originally stored in the program/variable area A11 of the nonvolatile RAM 56 (step 57), and stores the variables (DATA and BSS) that have been read out in step 57 in the area where the variables are directed to be originally stored in the program/variable area A11 of the nonvolatile RAM 56 (step 59). Thereafter, it is determined whether it is completed to store the variables corresponding to all of the constitutional devices in the program/variable area A11 (step 60). In step 60, if it is determined to be negative ("No"), the process returns to step 57 and continuously performs reading out the variables corresponding to the remaining constitutional devices and storing the variables that are read out.

In the meantime, if it is determined to be positive ("Yes") in step 60, the process proceeds to step S61, which will be described below.

Thereby, the CPU 51 executes the individual programs stored in the program/variable area A11 of the nonvolatile RAM 56 using corresponding variables (step 61), and determines whether a system fail is detected (step 62). Here, the "system fail" is an error in which the individual programs are not normally operated when the individual programs are executed in step 61, but may be an error found by performing an error check on the individual programs/variables before the individual programs is executed in step 61.

If it is determined to be negative (No) in step 62, that is, the system fail is not detected, the CPU 51 stores "ON (1)" in the boot flag area A12 of the nonvolatile RAM 56 as a boot flag (step 63).

In the meantime, if it is determined to be positive ("Yes") in step 62, that is, the system fail is detected, the CPU 51 stops processing, and performs the fail processing (step 64). Herein, as an example of fail process, for example, notifying a user that the system fail occurs using the UI 30 can be considered. If the system fail has been occurred, since there is a need to initialize at least the variables (the DATA and the BSS), the process returns to step 53 in case of the first activation, or returns to step 53 or step 57 in case of the second or later activation.

In the embodiments described above, even though the compressed program area A02 that the individual compressed programs are stored is placed in the ROM 55, the present disclosure is not limited thereto. That is, the compressed program area A02 may be placed in the server 5 (see FIG. 1) that is connected to the image forming apparatus 1 through the network 2 or in the memory card 81 placed in the card reader 80 connected to the USB IF 65. In this case, at the time of executing the IPL, a target to be read out by the compressed program may be set to the server 5 or the memory card installed in the card reader 80.

In the embodiments, even though the program/variable that activates the image forming apparatus 1 is stored in the compressed format in the ROM 55, the program/variable may be stored in uncompressed format. For example, an image to execute the program may be stored. In this case, the program/variable is read out from the ROM 55 and stored in the nonvolatile RAM 56 without being decompressed.

In the embodiments, the program/variable area A11 and the boot flag area A12 are placed in the nonvolatile RAM 56 and the work area A21 and the buffer area A22 are placed in the volatile RAM 57. However, the present disclosure is not limited thereto. For example, only the nonvolatile RAM 56 is provided, and the program/variable area A11, the boot flag area A12, the work area A21, and the buffer area A22 may be placed in the nonvolatile RAM 56.

In the embodiments, the controller 50 is provided in the image forming apparatus 1, but the present invention is not limited thereto. For example, the controller 50 may be applied to any device which is activated by executing a program for activating the device.

The program that implements the embodiment may be provided by communication means and stored in a recording medium such as CD-ROM to be provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A program executing apparatus, comprising:
a nonvolatile memory that stores a program for activating an equipment and a variable used in the program and sustains the stored program and the variable even though power is not supplied, the program and the variable being able to be read out and written into the nonvolatile memory; and
an executing unit that transmits the program and the variable to the nonvolatile memory when the activation of the equipment is instructed at an initial status where the program and the variable are not stored in the nonvolatile memory, and successively executes the program using the variable stored in the nonvolatile memory, and, when the activation of the equipment is re-instructed, executes the program using the variable stored in the nonvolatile memory, wherein
the variable includes a first variable which does not vary even though the program is executed and a second variable which varies according to the execution of the program, and wherein
when the activation of the equipment is re-instructed, the executing unit executes the program which is stored in the nonvolatile memory using the first variable and the second variable which are transmitted to and stored to the nonvolatile memory at the time when the activation of the equipment is instructed at an initial status,
when the activation of the equipment is re-instructed, the executing unit executes the program which is stored in the nonvolatile memory using the first variable which is transmitted to and stored in the nonvolatile memory at the time when the activation of the equipment is instructed at an initial status and the second variable which is transmitted to and is stored in the nonvolatile memory at the time when the activation of the equipment is re-instructed, the activation of the equipment is performed in response to supplying the power to the equipment, when the activation of the equipment in instructed at the initial status, the executing unit stores in first and second areas of the non-volatile memory, the first and second variables obtained by decompressing the program, and when the activation of the equipment is re-instructed, the executing unit restores in the non-volatile memory, only the second variable among the first and second variables by decompressing a part of the program.

2. The program executing apparatus according to claim 1, wherein when the activation of the equipment is re-instructed, the executing unit executes the program which is stored in the nonvolatile memory using the first variable which is transmitted to and stored in the nonvolatile memory at the time when the activation of the equipment is instructed at an initial status and the second variable which is transmitted to and stored in the nonvolatile memory when the activation of the equipment is instructed at the initial status and is not used when the program is executed.

3. The program executing apparatus according to claim 1, further comprising:

a read only memory that stores the program and the variable, wherein the executing unit transmits the program and the variable stored in the read only memory to the nonvolatile memory.

4. The program executing apparatus according to claim 3, wherein the read only memory stores the program and the variable in a compressed format, and the executing unit decompresses the compressed program and the variable that are stored in the read only memory.

5. The program executing apparatus according to claim 1, wherein the nonvolatile memory is one of an MRAM, a FeRAM, a PRAM, and a ReRAM.

6. The program executing apparatus according to claim 1, wherein the first variable includes a read-only data and the second variable includes a block started by symbol.

7. An image forming apparatus, comprising:

an image processing unit that performs at least one of processes including an image forming process to form an image on a recording material, an image reading process to read an image formed on a recording material, and an image transmitting and receiving process to transmit and receive the image;

a nonvolatile memory that stores a program for activating at least one of the processes and a variable used in the program and sustains the stored program and variable even though power is not supplied, the program and the variable being able to be read out and written into the nonvolatile memory; and an executing unit that transmits the program and the variable to the nonvolatile memory when the activation of at least one of the processes is instructed at an initial status where the program and the variable are not stored in the nonvolatile memory, and successively executes the program using the variable stored in the nonvolatile memory, and, when the activation of at least one of the processes is re-instructed, executes the program using the variable stored in the nonvolatile memory, wherein the variable includes a first variable which does not vary even though the program is executed and a second variable which varies according to the execution of the program, and wherein when the activation of the equipment is re-instructed, the executing unit executes the program which is stored in the nonvolatile memory using the first variable and the second variable which are transmitted to and stored to the nonvolatile memory at the time when the activation of the equipment is instructed at an initial status, when the activation of the equipment is re-instructed, the executing unit executes the program which is stored in the nonvolatile memory using the first variable which is transmitted to and stored in the nonvolatile memory at the time when the activation of the equipment is instructed at an initial status and the second variable which is transmitted to and is stored in the nonvolatile memory at the time when the activation of the equipment is re-instructed, the activation of the equipment is performed in response to supplying the power to the equipment, when the activation of the equipment in instructed at the initial status, the executing unit stores in first and second areas of the non-volatile memory, the first and second variables obtained by decompressing the program, and when the activation of the equipment is re-instructed, the executing unit restores in the non-volatile memory, only the second variable among the first and second variables by decompressing a part of the program.

8. A non-transitory computer-readable medium storing a program causing a computer to execute a process for executing a program executing method, comprising:

storing a program for activating an equipment and a variable used in the program in a nonvolatile memory in which the program and the variable can be read out and written into, and which sustains the stored program and the variable even though power is not supplied;

transmitting the program and the variable to the nonvolatile memory when the activation of the equipment is instructed at an initial status where the program and the variable are not stored in the nonvolatile memory; and executing the program stored in the nonvolatile memory using the variable stored in the nonvolatile memory, and, when the activation of the equipment is re-instructed, executing the program stored in the nonvolatile memory using the variable stored in the nonvolatile memory, wherein the variable includes a first variable which does not vary even though the program is executed and a second variable which varies according to the execution of the program, and wherein when the activation of the equipment is re-instructed, the executing unit executes the program which is stored in the nonvolatile memory using the first variable and the second variable which are transmitted to and stored to the nonvolatile memory at the time when the activation of the equipment is instructed at an initial status, when the activation of the equipment is re-instructed, the executing unit executes the program which is stored in the nonvolatile memory using the first variable which is transmitted to and stored in the nonvolatile memory at the time when the activation of the equipment is instructed at an initial status and the second variable which is transmitted to and is stored in the nonvolatile memory at the time when the activation of the equipment is re-instructed, the activation of the equipment is performed in response to supplying the power to the equipment, when the activation of the equipment in instructed at the initial status, the executing unit stores in first and second areas of the non-volatile memory, the first and second variables obtained by decompressing the program, and when the activation of the equipment is re-instructed, the executing unit restores in the non-volatile memory, only the second variable among the first and second variables by decompressing a part of the program.

9. A program executing apparatus, comprising:

a nonvolatile memory that stores a program for activating an equipment and a variable used in the program and sustains the stored program and the variable even though power is not supplied, the program and the variable being able to be read out and written into the nonvolatile memory; and an executing unit that transmits the program and the variable to the nonvolatile memory when the activation of the equipment is instructed at an initial status where the program and the variable are not stored in the nonvolatile memory, and successively executes the program using the variable stored in the nonvolatile memory, and, when the activation of the equipment is re-instructed, executes the program using the variable stored in the nonvolatile memory, wherein the variable includes a first variable which does not vary even though the program is executed and a second variable which varies according to the execution of the program, and wherein when the activation of the equipment is re-instructed, the executing unit executes the program which is stored in the nonvolatile memory using the first variable and the second variable which are transmitted to and stored to the nonvolatile memory at the time when the activation of the equipment is instructed at an initial status, when the activation of the equipment is re-instructed, the executing unit executes the program which is stored in the nonvolatile memory using the first variable which is transmitted to and stored in the nonvolatile memory at the time when the activation of the equipment is instructed at an initial status and the second variable which is transmitted to and stored in the nonvolatile memory when the activation of the equipment is instructed at the initial status and is not used when the program is executed, the activation of the equipment is performed in response to supplying the power to the equipment, when the activation of the equipment in instructed at the initial status, the executing unit stores in first and second areas of the non-volatile memory, the first and second variables obtained by decompressing the program, and additionally stores the second variable in a third area of the non-volatile memory, at the time of the execution of the program, the second variable stored in second area of the non-volatile memory is used, and when the activation of the equipment is re-instructed, the executing unit restores in the non-volatile memory, only the second variable in the second area among the first and second variables, by replacing the second variable in the second area with the second variable in third area which not used at the time of the execution of the program.

* * * * *